United States Patent [19]

Tsuda et al.

[11] Patent Number: 4,490,716
[45] Date of Patent: Dec. 25, 1984

[54] ULTRASONIC DISTANCE DETECTOR

[75] Inventors: Tadashi Tsuda, Nagoya; Seiichirou Hiramatsu, Ohbu; Tsuyoshi Maeno; Mitsugi Ohtsuka, both of Chiryu, all of Japan

[73] Assignee: Nippondenso Co., Ltd., Kariya, Japan

[21] Appl. No.: 321,224

[22] Filed: Nov. 13, 1981

[30] Foreign Application Priority Data

Nov. 14, 1980 [JP] Japan ................. 55-160979

[51] Int. Cl.$^3$ ................. G08G 1/00
[52] U.S. Cl. ................. 340/904; 367/909
[58] Field of Search ................. 340/32–34, 340/52 H, 904, 902, 901; 367/108, 909, 107

[56] References Cited

U.S. PATENT DOCUMENTS

| | | | |
|---|---|---|---|
| 3,778,823 | 12/1973 | Sato et al. | 367/909 |
| 4,015,232 | 3/1977 | Sindle | 340/38 S |
| 4,103,278 | 7/1978 | Satake | 367/107 |
| 4,206,511 | 6/1980 | Ries et al. | 367/104 |
| 4,207,620 | 6/1980 | Morgera | 367/108 |
| 4,238,778 | 12/1980 | Ohsumi | 340/33 |
| 4,240,152 | 12/1980 | Duncan et al. | 367/909 |
| 4,278,962 | 7/1981 | Lin | 340/34 |
| 4,349,823 | 9/1982 | Tagami | 340/33 |

FOREIGN PATENT DOCUMENTS 2424582 12/1974 Fed. Rep. of Germany .
3012236 10/1980 Fed. Rep. of Germany .

*Primary Examiner*—James J. Groody
*Attorney, Agent, or Firm*—Cushman, Darby & Cushman

[57] ABSTRACT

An ultrasonic detector for roadway vehicles comprises an array of electroacoustic transducers mounted on the rear of the vehicle. The transducers are sequentially driven by a transmitter circuit to transmit a pulsed, laterally shifting ultrasonic energy toward an object located behind the vehicle in one of plural regions defined by partially overlapped directivity patterns of adjacent transducers. A receiver circuit is coupled to the transducer array to receive echos returning from the object during the interval between successive beam transmissions. A logic circuit detects the lateral position of and the distance to the object for giving relevant indications on a display unit, the audible tone being variable depending on object distance. An audible warning device is optional.

3 Claims, 15 Drawing Figures

ULTRASONIC DISTANCE DETECTOR

BACKGROUND OF THE INVENTION

The present invention relates to an ultrasonic detector particularly for use with automotive vehicles for detecting objects behind.

Ultrasonic detectors have been developed to ensure safety against collision with an object located behind the vehicle. One such known detector as shown and described in Japanese Laid-open Publication No. 52-11535 is intended for use in detecting the presence of an object behind the vehicle to give a warning signal. A disadvantage inherent in the known system is that it lacks information on the location of the detected object with respect to the center line of the vehicle to avoid collision therewith when the vehicle is steered backward.

SUMMARY OF THE INVENTION

An object of the invention is therefore to provide an ultrasonic detector which permits location of a detected object by the use of an array of ultrasonic transducers which are sequentially activated to transmit a laterally shifting ultrasonic energy along the array.

An ultrasonic detector of the invention comprises first and second ultrasonic transmitting transducers arranged in a laterally spaced apart relationship for transmitting an ultrasonic energy of identical directivity pattern from each transmitting transducer, and an ultrasonic receiving transducer located between the transmitting transducers. The receiving transducer has a directivity pattern which partially overlaps the directivity patterns of the transmitting transducers to define laterally spaced apart first and second object detecting regions for receiving an echo returning from an object located therein. Further included are a transmitter circuit for sequentially activating the first and second transmitting transducers with a burst of ultrasonic pulses to transmit a pulsed ultrasonic energy from each transmitting transducer and laterally shift the point of transmission to the other transmitting transducer and a receiver circuit coupled to the receiving transducer for allowing it to receive the echo during the interval between successive beam transmissions. The outputs of the transmitter and receiver circuits are used for generating a display signal representing the lateral position of the object.

Preferably included are a circuit for detecting the interval between the time of transmission of acoustic energy and the time of reception of the echo as a representation of the distance to the object, and an audible warning device for generating sound at different tones in response to detected interval.

In a further preferred embodiment, a plurality of light emitting elements arranged in a pattern of rows and columns is provided to respond to display signals representative of the lateral position of and the distance to the object in a pattern of rows and columns.

A threshold detector may be included in the receiver circuit to detect an echo signal exceeding a predetermined threshold level, the detector having a hysteresis characteristic which cause it to remain activated when echo signal is detected. This serves to ensure definite warning indication when the echo signal fluctuates above and below the threshold level.

BRIEF DESCRIPTION OF THE DRAWINGS

The above and other objects, features and advantages of the present invention will become more apparent from the following description when taken in conjunction with the accompanying drawings in which a preferred embodiment of the present invention is shown by way of example.

DETAILED DESCRIPTION

Figure 1:
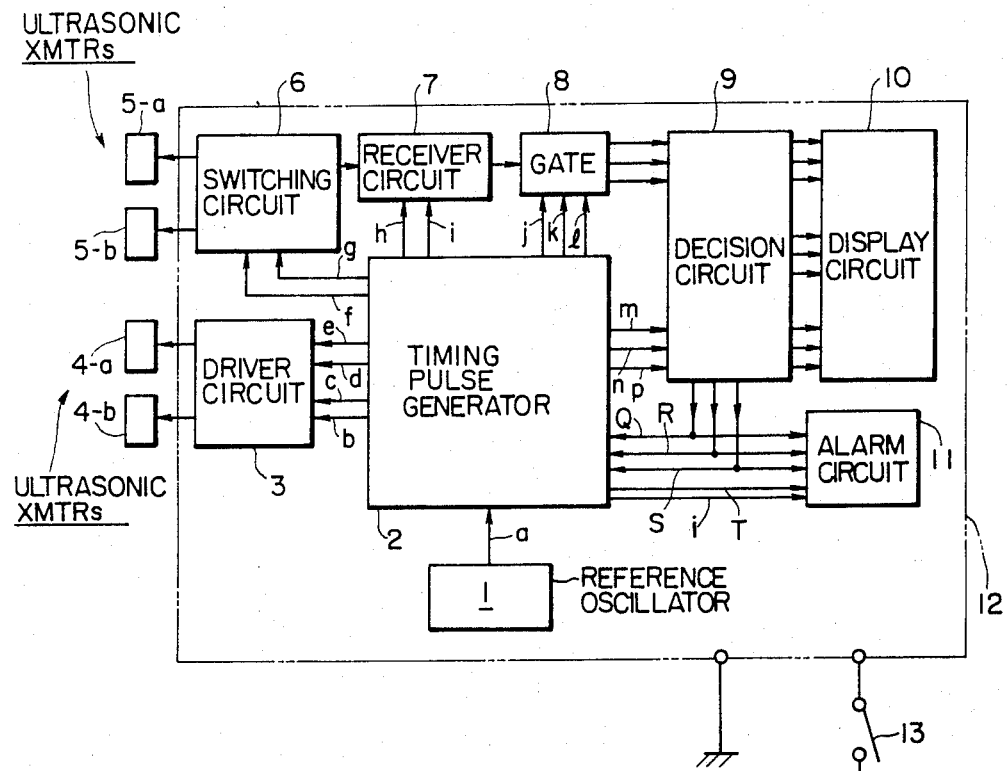
FIG. 1 is a block diagram of an ultrasonic detector constructed in accordance with the present invention.

As shown in FIG. 1, an ultrasonic detector according to the present invention comprises a reference frequency oscillator 1 for producing a time base clock signal from which signals including ultrasonic carrier and logic signals are generated, and a reference timing pulse generator 2 which also serves as a switching control circuit and is responsive to the clock signal for producing various signals such as ultrasonic transmission carrier pulses b, c, d and e, switching signals f and g for switching ultrasonic receiving transducer, gating signals h and i, signals j, k, and l for selecting display zones, reference signals m, n, and p for comparing distances, and alarm reference signals T and U. The reference pulse generator 2 is also supplied with signals Q, R and S indicative of the distance to an object from a logical decision circuit 9 for generating hysteresis in the reference signals m, n and p. The ultrasonic detector also includes a transmitter or drive circuit 3 for activating ultrasonic transmitting transducers 4-*a*, 4-*b* in response to the transmission carrier and control pulses b, c, d and e, and ultrasonic receiving transducers or receivers 5-*a* and 5-*b* for receiving ultrasonic energy reflected from an object. Further induced are switching circuit 6 for selecting ultrasonic echo signals received by the receivers 5-*a* and 5-*b* in response to switching signals f and g, a receiver 7 receptive of the signals from the switching circuit 6 for amplifying, selecting, detecting the signals received and comparing the levels thereof to generate an output pulse indicating the detection of an object, and a gate circuit 8 receptive of the pulse from the receiver 7 and the display zone selection signals j, k and l from the reference pulse generator 2. A decision circuit 9 is receptive of the reception indication signal from the gate circuit 8 and the distance-comparing reference signals m, n, p from the reference pulse generator 2 for determining the distance to the object. The ultrasonic detector also has a display circuit 10 for displaying the signal from the decision making circuit 9, and an alarm circuit 11 receptive of the distance signals Q, R and S from the decision making circuit 9 for generating an audible alarm signal.

The foregoing circuit components except the transmitters 4-a, 4-b and the receivers 5-a, 5-b are enclosed by the broken line 12. The ultrasonic detector is powered by a battery 15 via a fuse 14 on an automobile on which the detector is installed. The ultrasonic detector is switched on when a power supply switch 13 is closed. The power supply switch 13 is ganged with a reverse gear (not shown) of the automotive transmission mechanism so that the ultrasonic detector is turned on automatically when the reverse gear is selected where the vehicle is moved backward.

Figure 2:
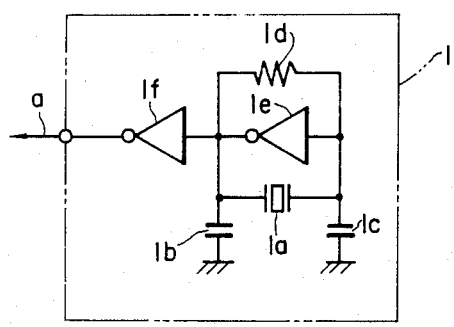
FIG. 2 is a circuit diagram of a reference signal oscillator in the ultrasonic detector shown in FIG. 1.

As illustrated in FIG. 2, the reference oscillator 1 comprises a ceramic vibrator 1a for generating acoustic energy at 640 kHz, capacitors 1b, 1c, a resistor 1d and inverters 1f, 1e.

Figure 3:
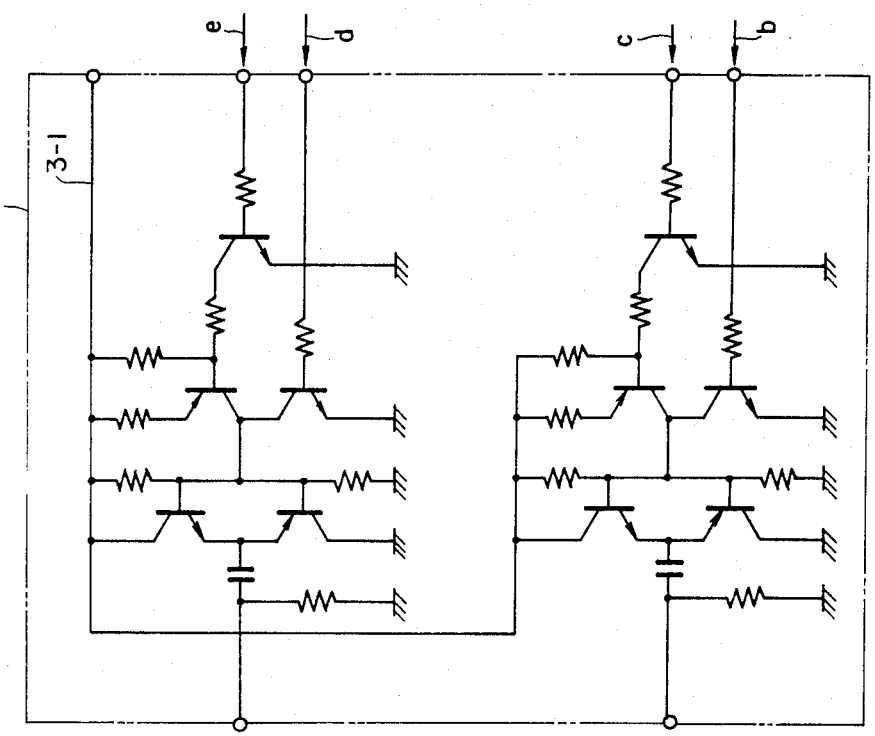
FIG. 3 is a circuit diagram of a circuit for driving an ultrasonic wave transmitter in the ultrasonic detector of FIG. 1.

The circuit 3 for driving the ultrasonic wave transmitters is shown in FIG. 3 and is comprised of a pair of single-ended push-pull driving circuits having a power supply terminal 3-1 and comprising transistors, resistors and capacitors.

Figure 4:
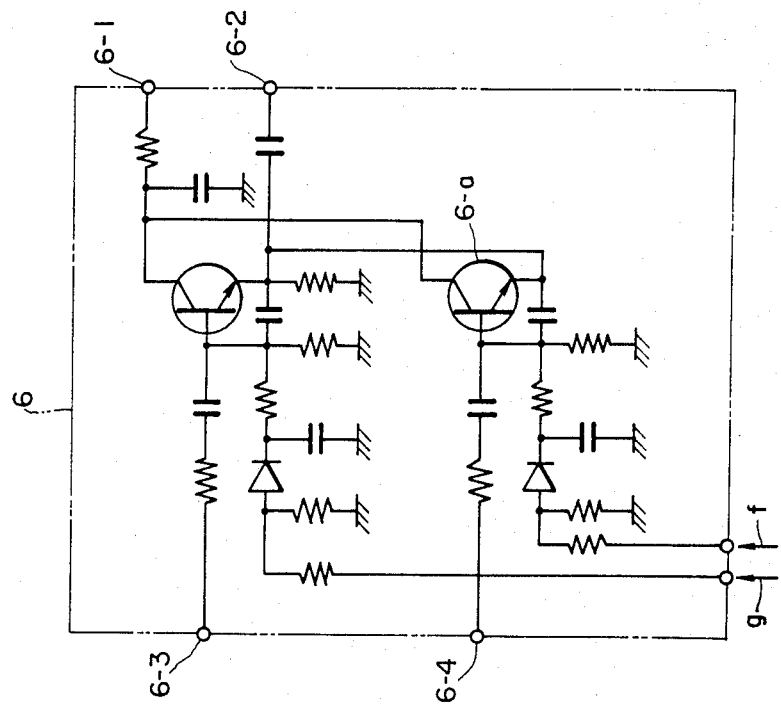
FIG. 4 is a circuit diagram of a reception switching circuit in the ultrasonic detector shown in FIG. 1.

As shown in FIG. 4, the switching circuit 6 comprises transistors, resistors, capacitors and diodes, and includes a power supply terminal 6-1, an output terminal 6-2 at which echo signals appear, and terminals 6-3, 6-4 connected respectively to the ultrasonic receivers 5-a, 5-b.

Figure 5:
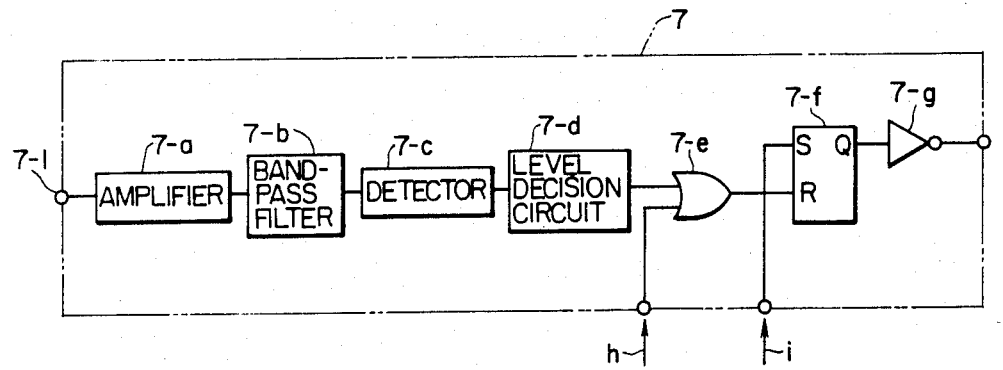
FIG. 5 is a block diagram of a receiver in the ultrasonic detector of FIG. 1.

The receiver circuit 7, shown in FIG. 5, comprises an amplifier 7-a, a band-pass filter 7-b, a detector 7-c, a level decision circuit 7-d, an OR gate 7-e, a latch 7-f of an RS flip-flop, and an inverter 7-g.

Figure 6:
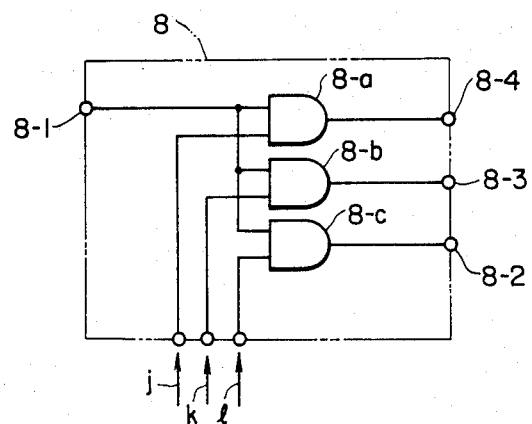
FIG. 6 is a circuit diagram of a gate circuit in the ultrasonic detector illustrated in FIG. 1.

In FIG. 6, the gate circuit 8 comprises three AND gates 8-a, 8-b and 8-c each having two input terminals.

Figure 7:
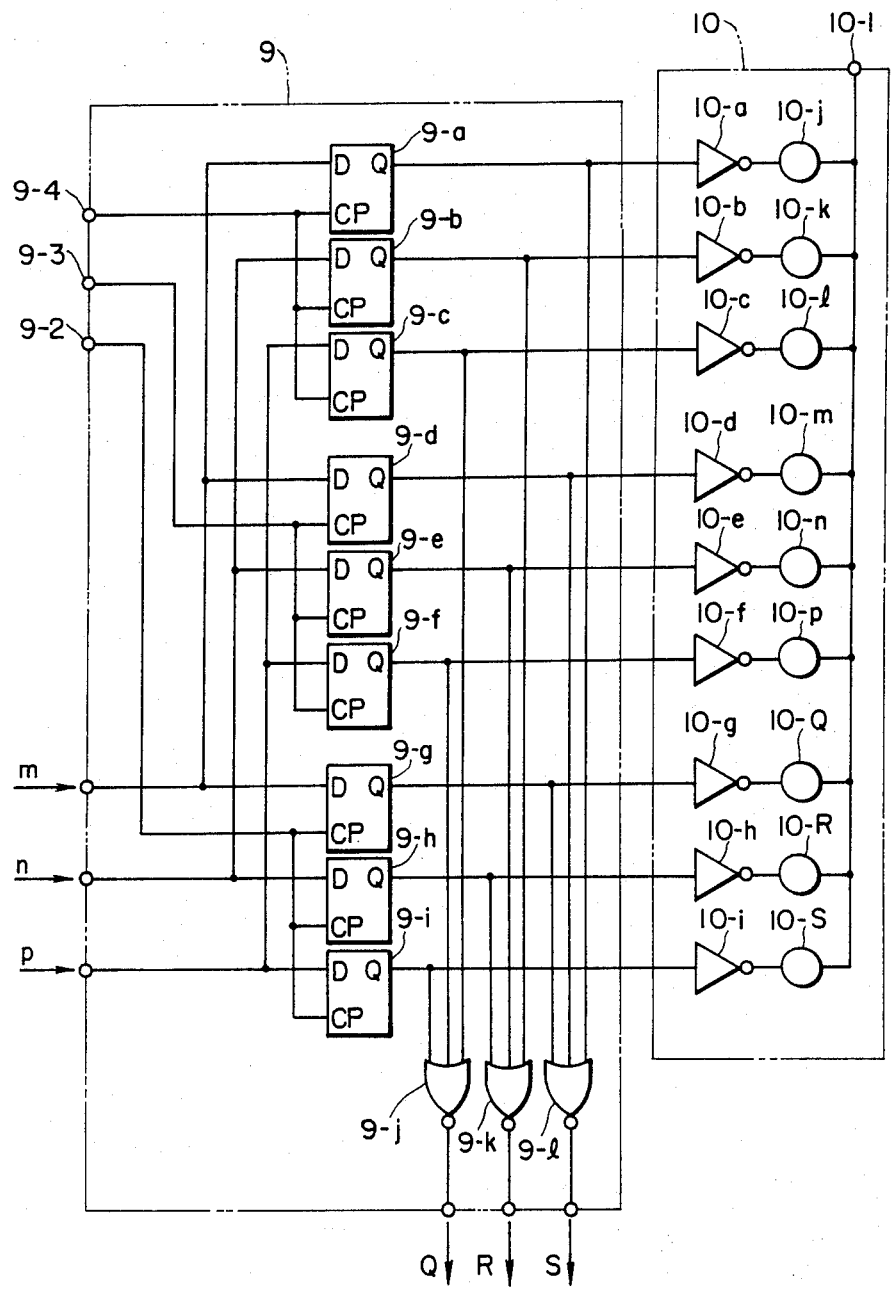
FIG. 7 is a circuit diagram of a reception decision circuit and a display circuit in the ultrasonic detector of FIG. 1.

The reception decision circuit 9 and the display circuit 10 are illustrated in FIG. 7. The reception decision circuit 9 is comprised of D-type flip-flops 9-a to 9-i, and NOR gates 9-j, 9-k and 9-l each having three input terminals. The display circuit 10 comprises inverters 10-a to 10-i, and display devices such as lamps 10-j, 10-k, 10-l, 10-m, 10-n, 10-p, 10-Q, 10-R and 10-S.

Figure 8:
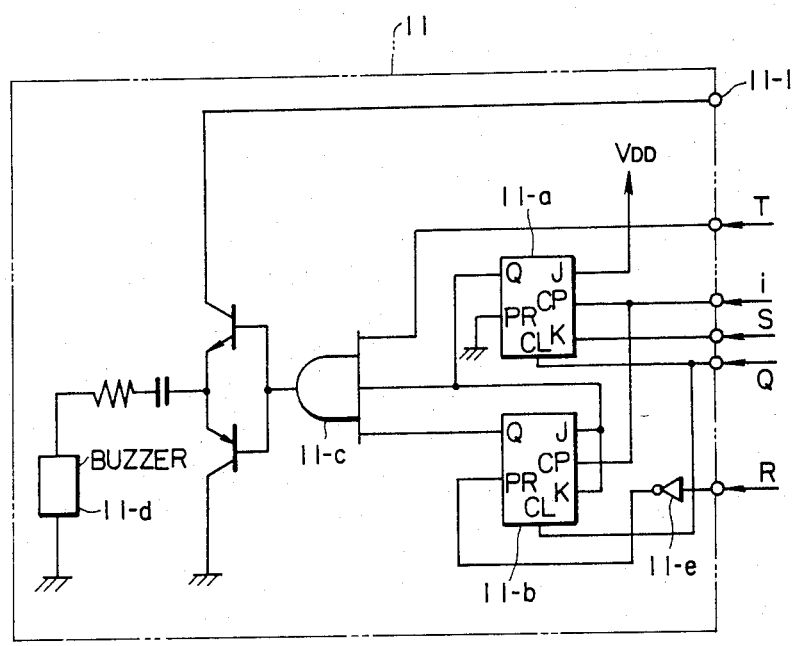
FIG. 8 is a circuit diagram of an alarm circuit in the ultrasonic detector shown in FIG. 1.

As illustrated in FIG. 8, the alarm circuit 11 is composed of JK flip-flops 11-a and 11-b, an AND gate 11-c having three input terminals, an inverter 11-e, a circuit composed of a pair of transistors, and a buzzer 11-d for producing an alarm sound.

Figure 9:
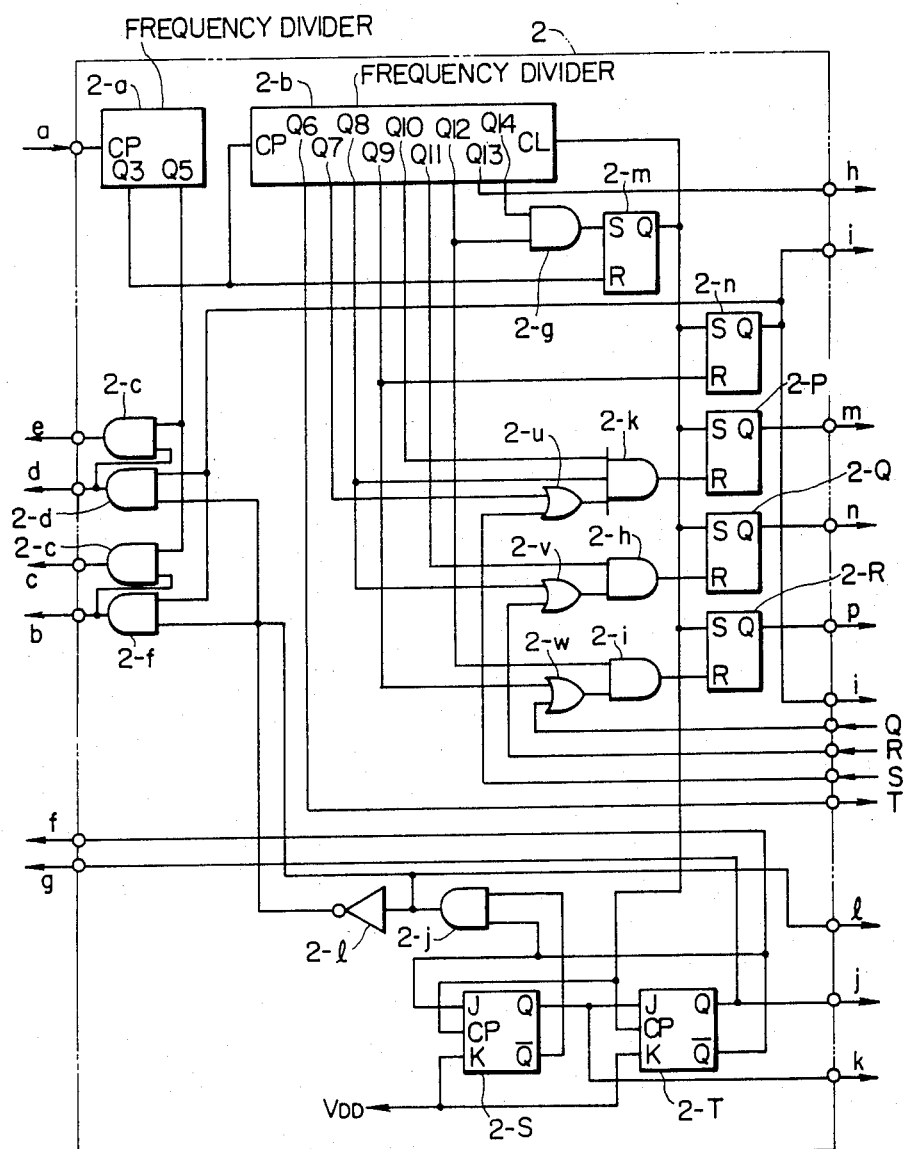
FIG. 9 is a circuit diagram of a reference pulse generator in the ultrasonic detector of FIG. 1.

As shown in FIG. 9, the reference pulse generator 2 comprises a 7-stage binary counter 2-a, a 14-stage binary counter 2-b, AND gates 2-c to 2-j each having two input terminals, an AND gate 2-k having three input terminals, an inverter 2-l, RS flip-flops 2-n, 2-p, 2-Q and 2-R, JK flip-flops 2-S, 2-T, and OR gates 2-U, 2-V and 2-W.

Figure 10A:
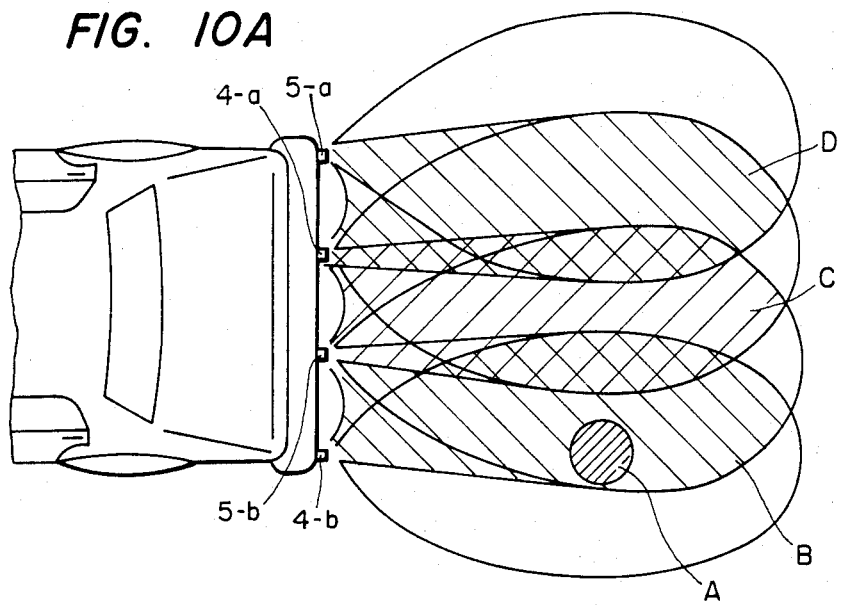
FIGS. 10A and 10B are fragmentary plan and side elevational views, respectively, of an automobile to which ultrasonic wave transmitters and receivers are attached.
Figure 10B:
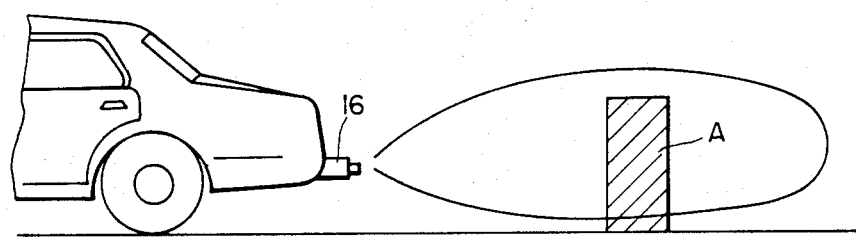
Figure 11:
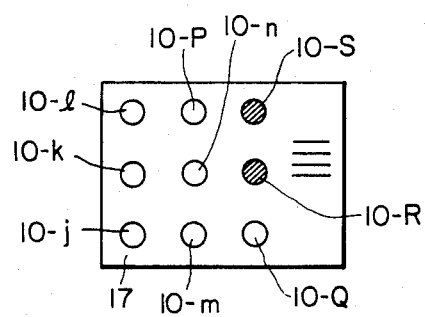
FIG. 11 is a front elevational view of a display device.

The ultrasonic transmitters 4-a, 4-b located alternately with the ultrasonic receivers 5-a, 5-b along the vehicle rear bumper 12 as shown in FIGS. 10A and 10B.

The transmitters and receivers comprise ultrasonic horns (not shown) which have ultrasonic directivity patterns of radiation and reception as illustrated in FIG. 10A. The directivity patterns of the transmitters and receivers are such that an obstacle A can be detected which is in a region B where the radiation and reception patterns of the transmitter 4-b and the receiver 5-b are partially overlapped. This arrangement prevents an ultrasonic energy from being directly coupled through the transmitter 4-b to the receiver 5-b. Likewise, the transmitter 4-a and the receiver 5-b, and the transmitter 4a and the receiver 5-a have directivity patterns partially overlapped so that object in regions C, D can be detected. Thus, any object in the regions B, C and D can be delected by switching from a reception mode in which ultrasonic waves from the transmitters 4-a, 4-b are detected by the receiver 5-a, to another reception mode in which ultrasonic waves from the transmitter 4-a are detected by the receivers 5-a, 5-b.

The display device 13 includes a plurality of display lamps arranged two-dimensionally in rows and columns and includes the buzzer 11-d. The display device 13 is disposed rearward of the vehicle rear seat so that the driver can easily see the display device while steering the vehicle rearward.

Figure 12:
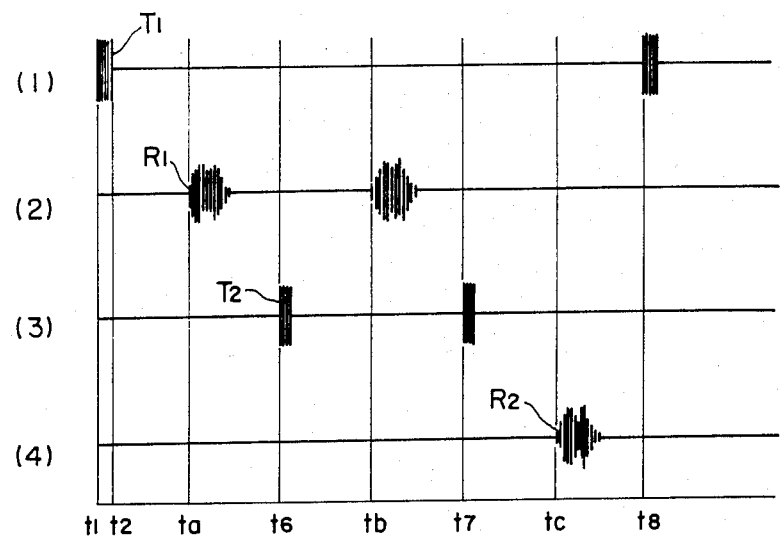
FIGS. 12, 13 and 14 are views showing the waveforms of signals generated in the ultrasonic detector.

Operation of the ultrasonic detector thus constructed will be described with reference to FIG. 12. In operation, the ultrasonic transmitter 4-b generates ultrasonic pulses T1, the ultrasonic transmitter 4-a generating ultrasonic pulses T2, the ultrasonic receiver 5-b generating a pulsed signal R1 indicative of an ultrasonic wave reflected from an obstacle, and the ultrasonic receiver 5-a generates a pulsed signal R2 indicative of an ultrasonic wave reflected from an object behind. A detecting operation is carried out during an interval beginning with a time t1 and ending with time t8. In such a single operation, the ultrasonic transmitter 4-b emits ultrasonic pulses and the ultrasonic receiver 5-b receives an ultrasonic wave reflected from an obstacle. Then, ultrasonic pulses are discharged from the ultrasonic transmitter 4-a and a reflected ultrasonic wave is detected by the ultrasonic receiver 5-b and then by the ultrasonic receiver 5-a. The transmitter 4-b is again energized to emit a pulsed ultrasonic wave to start another cycle of operation. The foregoing operation will be repeated for successive detecting operations.

The reference signal oscillator 1 applies a clock signal "a" to the reference pulse generator 2, the clock signal having a frequency which is $2^n$ times the frequency of the carrier to be emitted. The frequency divider 2-a in the reference pulse generator 2 devides the frequency of the clock signal "a". The frequency divider 2-a produces an output Q3 that is supplied as a clock signal to the frequency divider 2-b and as a reset signal to the RS flip-flop 2-m. The AND gate 2-g produces a signal at a logic level of 1 only when terminals Q12, Q14 of the frequency divider 2-b produce signals at a logic level of 1.

It is assumed that the terminals Q12, Q14 of the frequency divider 2-b produce outputs at a logic level of 1 and the AND gate 2-g produces an output signal at a logic level of 1, and hence the output Q of the RS flip-flop 2-m is at a logic level of 1 at a time t1. At the time t1, the frequency divider 2-b is cleared by the output Q from the flip-flop 2-m, and all outputs Q6 to Q14 of the frequency divider 2-b are held at a logic level of 0. The set terminals of the RS flip-flops 2-n, 2-p, 2-Q and 2-R are supplied with an input at a logic level of 1, and their outputs are changed from a logic level of 0 to a logic level of 1. The output Q of the flip-flop 2-m is supplied as a clock input to the JK flip-flops 2-S, 2-T.

Figure 13:
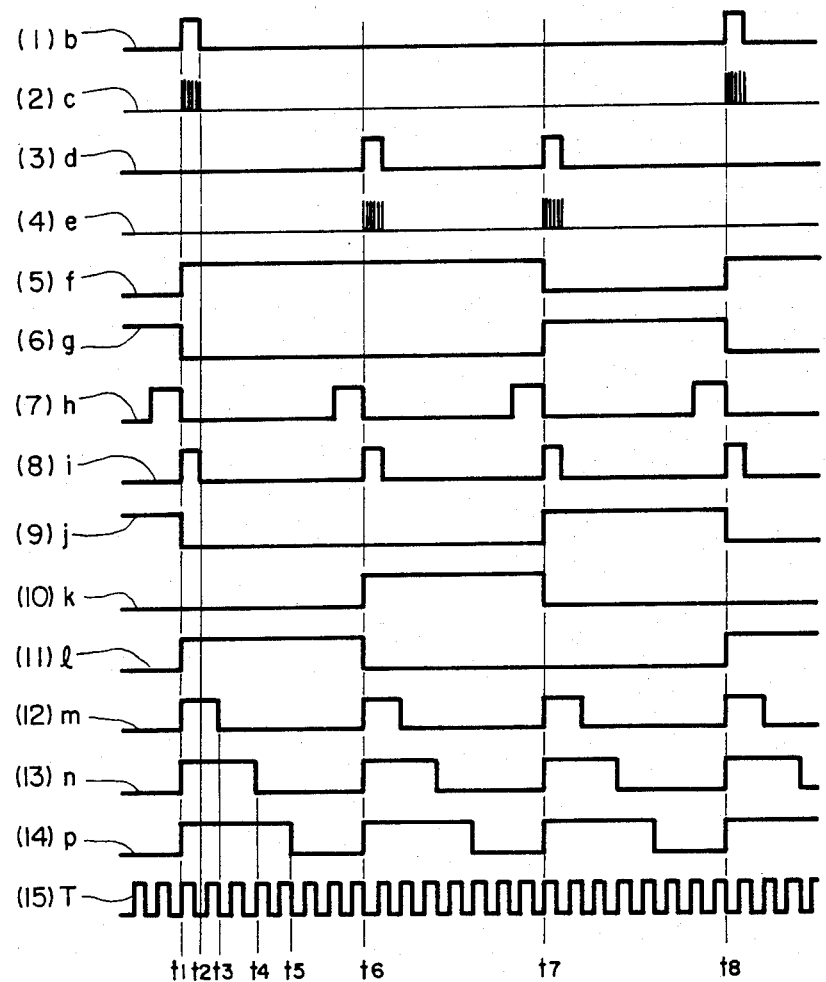

As the components of the reference pulse generator 2 start to operate from the time t1, they produce outputs the waveforms of which are illustrated in FIG. 13 and repeat the operation as from the time t1 to the time t8, so that the transmitters 4-a, 4-b will emit ultrasonic waves and the receivers 5-a, 5-b will receive reflected ultrasonic waves on a time sharing basis for detection of any obstacles in the regions B, C and D.

Figure 14:
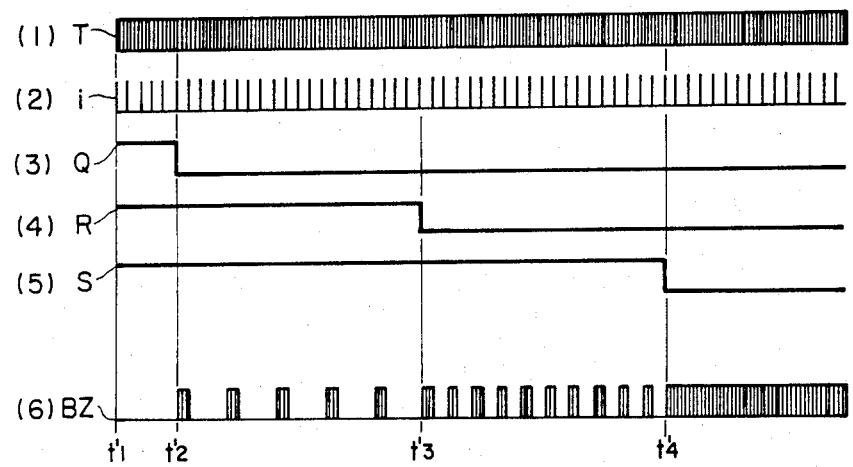

Operation of the alarm circuit 11 will be described with reference to FIG. 14 which shows the waveforms of signals in the alarm circuit 11. A frequency signal for energizing the buzzer 11-d is supplied to a terminal T, and a clock signal is supplied to a terminal i. When terminals Q, R and S are at a logic level of 1, the clear terminals of the JK flip-flops 11-a, 11-b are at a logic level of 1, the hence the outputs of the JK flip-flops 11-a, 11-b are at a logic level of 0. At this time, the AND gate 11-c produces an output at a logic level of 0, and the buzzer 11-d remains de-energized in the time interval from a time t'1 to a time t'2 in FIG. 14.

When the terminal Q is at a logic level of 0 and the terminals R, S are at a logic level of 1, the terminals J, K of the JK flip-flop 11-a are at a logic level of 1 and the clear and preset terminals at a logic level of 0, so that the output Q of the JK flip-flop 11-a will be alternately at logic levels of 1 and 0 each time the clock pulses are applied to the terminal i. Thus, the output signal of the JK flip-flop 11-a has a frequency which is half the frequency of the clock signal at the terminal i. The terminals J, K of the JK flip-flop 11-b are supplied with the output signal from the flip-flop 11-a which has a frequency half that of the clock signal at the terminal i, and the clear and preset terminals of the flip-flop 11-b are held at a logic level of 9. Thus, the output Q of the flip-flop 11-b is reversed when the terminals J, K are at a logic level of 1. The output signal from the flip-flop 11-b has a frequency which is a quarter of that of the clock signal applied to the terminal i. The AND gate 11-c now supplies an input T for energizing the buzzer which has a duty cycle of ¼ with respect to four clock pulses as shown in FIG. 14 in the time interval from the time t'2 to t'3.

When the terminals Q, R are at a logic level of 0 and the terminal S is at a logic level of 1, the output Q of the JK flip-flop 11-a has a frequency which is half that of the clock signal, while the output Q of the JK flip-flop 11-b is held at a logic level of 1 as the preset terminal thereof is at a logic level of 1. Thus, the AND gate 11-c produces an output having a frequency which is half that of the clock signal. The buzzer 11-d is now supplied with an input T having a duty cycle of ½ with respect to two clock pulses as shown in the time interval from t'3 to t'4.

When the terminals Q, R and S are at a logic level of 0, the output of the JK flip-flop 11-a is held at a logic level of 1 as the terminal K is at a logic level of 0, and the output of the JK flip-flop 11-b is held at a logic level of 1, so that the AND gate 11-c supplies the buzzer 11-d with a continuous input T in the time interval beginning with the time t'4.

Accordingly, as an object approaches the automobile gradually, the alarm sound generated varies with time (t'1 to t'4).

Overall operation of the ultrasonic detector for detecting an obstacle will be described with reference to a particular situation.

Wnen an ultrasonic pulse T1 is emitted from the transmitter 4-b at the time t1 and an ultrasonic wave as reflected from an obstacle reaches the receiver 5-b at a time ta, the signal indicative of the received ultrasonic wave is supplied from the receiver 5-b to the terminal 6-4 shown in FIG. 4, whereupon a receiver switching signal f energizes the transistor 6-a to amplify the signal supplied, and the terminal 6-1 produces an amplified output. The amplified signal is then supplied to an input 7-1 of the receiver 7 in which the signal goes through the amplifier 7-a and the band-pass filter 7-b to remove noises, is detected by the detector 7-c, and is delivered to the level decision circuit 7-d. When the level of the detected signal is determined by the level decision circuit 7-d to be indicative of an ultrasonic wave reflected by the obstacle, the output from the level decision circuit 7-d is changed from a logic level of 0 to a logic level of 1. The signal is converted into a reception pulse which is supplied to one of the inputs of the OR gate 7-e, the other input of which is supplied with a signal h from the reference pulse generator 2. The output from the OR gate 7-e is supplied as an input to the reset terminal of the RS flip-flop 7-f. At the time t1, a signal i from the reference pulse generator 2 is supplied to the set terminal of the RS flip-flop 7-f, the output Q of which is at a logic level of 1, and the output of the inverter 7-g or the receiver 7 is at a logic level of 0. As the reception pulse is supplied to the reset terminal of the RS flip-flop 7-f at the time ta, the output from the flip-flop 7-f is changed from a logic level of 1 to a logic level of 0. The output of the inverter 7-g is at a logic level of 1 at the time ta. Briefly summarized, when the ultrasonic pulse T1 is emitted at the time t1 and the reflected ultrasonic wave is received at the time ta, the output of the receiver 7 remains at a logic level of 0 from the time t1 to the time ta and is changed to a logic level of 1 at the time ta. The pulse indicative of the received wave is supplied to an input terminal 8-1 of the gate circuit 8 for selection in the display device in response to application of the display zone selection signals j, k, l from the reference pulse circuit 2. At the time ta, the reception pulse at a logic level of 1 is allowed by the display zone selection signal 1 to be produced from the AND gate 8-c at a logic level of 1 at the time ta. The reception pulse is applied to an input terminal 9-2 of the decision circuit 9, and is supplied as a clock input signal at a logic level of 1 to the D-type flip-flops 9-g, 9-h and 9-i at the time ta, in which the distance-comparing reference signals m, n and p from the reference pulse generator 2 are compared with the input at the time ta, that is, the rising pulse due to the received ultrasonic wave. When the time ta is between times t3 and t4 in FIG. 13, the D inputs of the D-type flip-flops 9-h, 9-i are held at a logic level of 1 during the interval between the times t3 and t4, and hence the D-type flip-flops 9-h, 9-i produce outputs at a logic level of 1. With the outputs from the D-type flip-flops 9-h, 9-i at a logic level of 1, the inverters 10-h, 10-i in the display device 10 produce outputs at a level of 0, lighting the lamps 10-r, 10-s, respectively. The outputs Q, R of the NOR gates 9-j, 9-k are at a logic level of 0, and the outputs Q, R of the decision circuit 9 are supplied as inputs to the alarm circuit 11 and the reference pulse generator 2. The alarm circuit 11 is now energized to enable the buzzer 11-d to produce an intermittent alarm sound each time a clock pulse is applied during the time interval from the time t'3 to the time t'4.

The inputs Q, R to the reference pulse generator 2 serve to change the distance-comparing reference signals p, n and produce hysteresis, which will be described below.

In the illustrated embodiment, the distance-comparing reference signals m, n, l are altered to have a longer duration when either one of the signals S, R, Q switches from logical "1" to logical "0". For example, when the distance-comparing reference signal p is applied during the time interval (t5–t1) and the ultrasonic wave R1 is received at the time "ta" which is between the times t4 and t5, the signal is supplied as a clock signal to the D-type flip-flops 9-g, 9-h, 9-i in the decision circuit 9, whereupon the D-type flip-flop 9-i produces a logical "1". This output from the flip-flop 9-i energizes the display lamp 10-S and causes the NOR gate 9-j to produce an output Q at a logical 0, which is supplied to the OR gate 2-W of the timing pulse generator 2. Then, the output Q9 of the frequency divider 2-b is allowed to pass through the OR gate 2-W. The output of the OR gate 2-W and the output Q-12 of the frequency divider 2-b are applied to the AND gate 2-i, which produces a reset signal for the RS flip-flop 2-R. Thus, the reset signal for the flip-flop 2-R is controlled only by the output Q-12 of the frequency divider 2-b when the signal Q is at a logical 1. When the signal Q is at logical 0 on the other hand, the output Q9 of the frequency divider 2-b is applied as a reset signal to the RS flip-flop 2-R, which produces an output p having a longer interval than the time interval (t5–t1).

More specifically, when ultrasonic wave is directed to an ordinary object such as pedestrians or walls, the incident energy tends to be irregularly reflected and arrives at an ultrasonic receiver at varying intervals. With the use of a constant distance-comparing reference signal used for comparison, however, the display lamp tends to flicker if the level of the received signal is close to that of the reference signals m, n, p. Such a flickering effect is prevented by increasing the interval of the reference signal p when the display lamp is energized. The reference pulse generator 2 will operates in the same way as above with respect to the distance-comparing signals m, n.

The ultrasonic detector of the invention will operate in the same manner when the transmitter 4-a and the receiver 5-b, or the transmitter 4-a and the receiver 5-a are in operation, in which case different display lamps in the display device 10 are lighted depending on the position of an object.

While in the illustrated embodiment the particular ICs are disclosed for the components of the reference pulse generator 2, other ICs may be used as long as they can produce necessary output pulses. Although three distance-comparing reference signals m, n, p are described, a single or a multiplicity of such reference signals may be employed dependent on the distance comparison desired. The ultrasonic transmitters and receivers may be arranged differently, e.g., the other way around, and detection zones or patterns may be varied as the number of transmitters and receivers is changed. The power supply switch may be so arranged as to be actuatable independently of selection of the reverse gear in the transmission, so that the distance up to a following car or an approacing object may be detected while the automobile is at rest. The ultrasonic transmitters and receivers may be mounted on the front, sides or roof of the automobile in order to be capable of detecting obstacles or objects approaching forward, laterally, or from above the automobile. The ultrasonic detector may be provided with a self-diagnosing circuit using simple logic elements connected to the transmitters, receiver, and display device.

Although a certain preferred embodiment has been shown and described in detail, it should be understood that various changes and modifications may be made therein without departing from the scope of the appended claims.

What is claimed is:

1. An ultrasonic alarm system for detecting at least one object located with respect to a moving vehicle, comprising:

a first array of ultrasonic transmitting transducers for emitting ultrasonic energies in respective directivity patterns;

a second array of ultrasonic receiving transducers disposed alternatively with said ultrasonic transmitting transducers and actuatable in timed alternate relation to said ultrasonic transmitting transducers for receiving ultrasonic echoes reflected from any objects located in laterally overlapping detecting regions defined in said directivity patterns;

first means for sequentially energizing said ultrasonic transmitting transducers to emit the ultrasonic energies successively in said directivity patterns;

second means for sequentially receiving echo signals indicative of said ultrasonic echoes from said ultrasonic receiving transducers;

third means for generating first signals representative of sequential operations of said ultrasonic transmitting transducers;

fourth means for generating second signals of varying durations indicative of different distance ranges in each of said laterally overlapping detecting regions;

display means comprising a matrix of light-emitting elements; and display control means responsive to said echo signals and said first signals for energizing rows of said light-emitting elements to indicate any objects in said laterally overlapping detecting regions and responsive to said echo signals and said second signals for energizing columns of said light-emitting elements to indicate any objects in said distance ranges, said display control means comprising:

a plurality of AND gates each having first input terminals receptive of said echo signals, second input terminals receptive of said first signals, and an output terminal for issuing position signals, and a plurality of groups of D-type flip-flops, said D-type flip-flops in each group having input terminals receptive of said second signals, respectively, clock terminals receptive of one of said first signals, and output terminals for issuing energization signals to one of said columns of said light-emitting elements.

2. An ultrasonic alarm system according to claim 1, including an audible alarm generator responsive to said energization signals for generating an audible warning having a variable tone dependent on the position of the objects in said distance ranges.

3. An ultrasonic distance detector for detecting an object moving with respect thereto, comprising:

first and second ultrasonic transmitting transducers arranged in a laterally spaced apart relationship for transmitting ultrasonic energies of identical directivity pattern from each transmitting transducer;

an ultrasonic receiving transducer located between said transmitting transducers and having a directivity pattern which partially overlaps the directivity patterns of said transmitting transducers to define laterally spaced apart first and second object detecting regions for receiving an ultrasonic echo returning from an object located therein;

a transmitter circuit for sequentially activating said first and second transmitting transducers with a burst of ultrasonic pulses to transmit pulsed ultrasonic energy from each transmitting transducer and laterally shift the point of transmission to the other transmitting transducer;

a receiver circuit, coupled to said receiving transducer, for allowing it to receive said echo during an interval between successive energy transmissions from said first and second transmitting transducers;

actuation signal generator means for generating an actuation signal indicative of energization of one of said first and second ultrasonic transmitting transducers as sequentially activated by said transmitter circuit;

display means including a first display area for displaying a distance up to an object in said first object detecting region and a second display area for displaying a distance up to an object in said second object detecting region, said display means including a plurality of light-emitting elements arranged in a two-dimensional pattern of horizontal rows indicative of positions of the objects in said first and second object detecting regions and vertical columns comprising said first and second display areas, respectively, for representing the distances to the objects in said first and second object detecting regions; and display control means for deriving the distance to the object from a time interval which runs from the time when the ultrasonic energy is transmitted from one of said first and second ultrasonic transmitting transducers by said transmitter circuit to the time when the ultrasonic echo is received by said receiver circuit, and for effecting a display of the derived distance on one of said first and second display area which corresponds to said actuation signal from said actuation signal generator means;

said ultrasonic distance detector including reference signal generator means for generating first and second reference signals representative of first and second distance ranges, respectively, in the direction of emission of the ultrasonic energies in timed relation to the emission of the ultrasonic energies from said first and second ultrasonic transmitting transducers, said display control means including means for comparing a signal from said receiver circuit indicative of reception of the ultrasonic echo with said first and second reference signals from said reference signal generator means to determine whether the object is located in said first or second distance range, and means for energizing those light-emitting elements which correspond to the determined distance range, if any, and to the object detecting region indicated by the actuation signal generator means; and said ultrasonic distance detector including means for varying the reference signal corresponding to the determined distance range, if any, in order to increase the determined distance range and for restoring said reference signal representative of the original distance range when no object is detected in said distance range.

* * * * *